(No Model.)

F. MOLINI.
MACHINE FOR SHELLING PEASE.

No. 252,616. Patented Jan. 24, 1882.

Witnesses:

Inventor:
Felice Molini
By his Attys,

N. PETERS. Photo-Lithographer, Washington, D. C.

UNITED STATES PATENT OFFICE.

FELICE MOLINI, OF SAN FRANCISCO, CALIFORNIA.

MACHINE FOR SHELLING PEASE.

SPECIFICATION forming part of Letters Patent No. 252,616, dated January 24, 1882.

Application filed August 2, 1881. (No model.)

*To all whom it may concern:*

Be it known that I, FELICE MOLINI, of the city and county of San Francisco, in the State of California, have invented certain new and useful Improvements in Machines for Shelling Pease; and I do hereby declare that the following is a full, clear, and exact description thereof, reference being had to the accompanying drawings.

My invention relates to pea-shelling machines of the class or kind employing a pair of rollers that rotate toward and in close relation to each other, and operate to separate the pease by crushing and drawing the pod through between the rollers, leaving behind such pease as are too large to pass through. These rollers are usually set apart far enough to allow them to seize upon the end of the pod as it is presented, but while detaching the larger pease they do not remove the smaller ones at the ends of the pod, so that their operation is more or less defective, and much of the small and tender or desirable part of the contents is carried through the rollers and crushed in the pod instead of being saved.

My improvement has for its object to provide a simple splitting and separating device for removing the contents of the pod in an effective manner without waste.

The invention consists in mounting in a single machine, in conjunction with plain rollers, a series of spirally-grooved rollers, having the breadth of the grooves graduated in the different rollers of the series. The pods are introduced between these rollers in such manner that the edge of the spiral seizes and cuts into the end of the pod as the edge and the cylindrical roller together draw the pod through. The lateral progression of the spiral along the cylindrical roller and the rotating movement of the two rollers at the same time divide the pod without cutting or crushing it and detach the pease along the line of their attachment. This construction and mode of operation will be understood by the following description in connection with the accompanying drawings.

Figure 1:
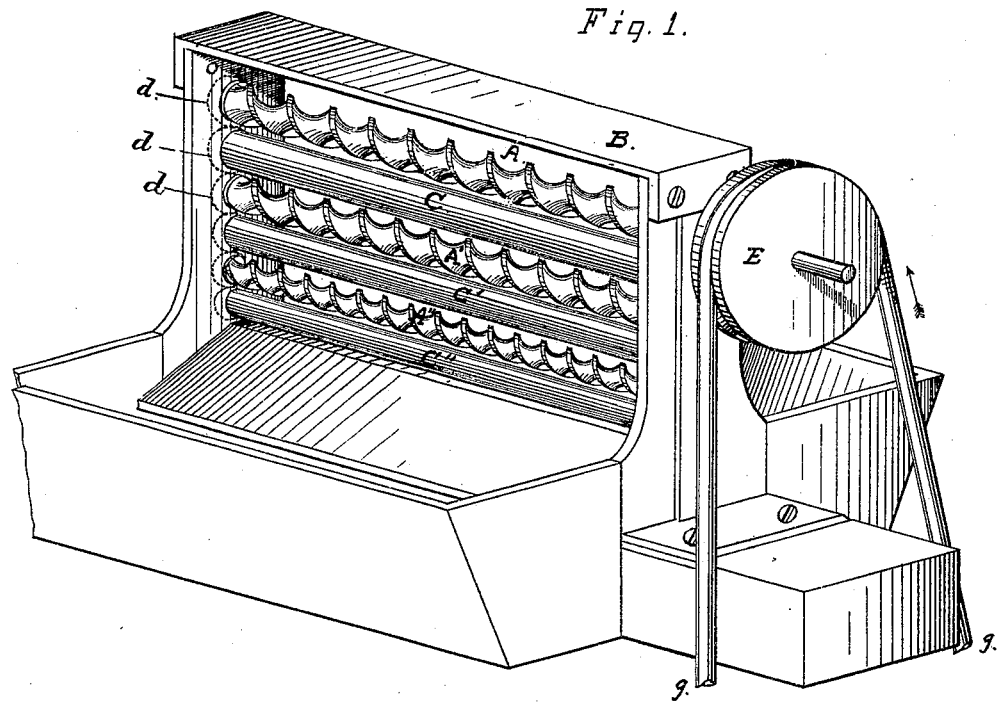
Figure 3:
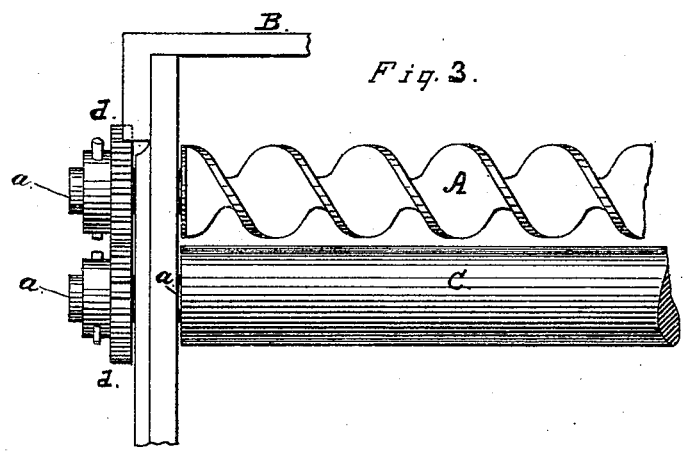
Figure 2:
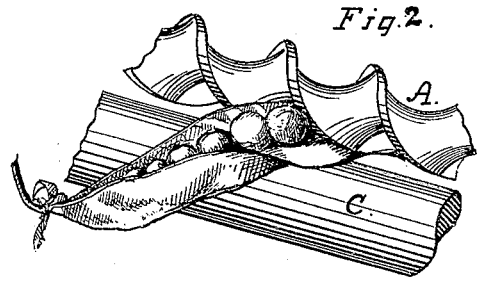

In the drawings, Figure 1 is a perspective view of my improved machine adapted to receive and act on pods of various sizes. Fig. 2 shows the operation of the rollers. Fig. 3 is a detail view of a pair of rollers.

The spiral roller A may be made in various ways; but as a simple mode of forming it I take a stiff blade of metal, of suitable thickness to hold its shape and work without springing, and twist it into a spiral form, after the manner of making auger-shanks, so that a uniform twist is produced. At each end of the roller I turn a journal, $a$, to rest in the bearings of a supporting-frame. Such a roller can be made also from an auger-body having a regular twist. This roller I fix in a frame, B, parallel with and against a cylindrical plain-faced roller, C, so that the edges of the spiral run against or close to the face of the roller C, and I connect the two by gears $d\ d$, to rotate together at a common rate of speed and toward each other.

To adapt the machine to work successfully upon all sizes of pods, I arrange several sets of rollers, A C, A' C', A" C", within a single frame, to receive and operate on large, small, and medium-sized pods, as the spirals should be deep enough to pass into the pod and turn out or spread the halves on each side of it, but not wide enough apart to allow the pease to be drawn through or pass over the roller. I run all these rollers from a single pulley by gearing them into one another, as shown in Fig. 1 of the drawings, where $d\ d$ are the gears, and E the driving-pulley on the upper roller, A.

A convenient mode of setting up and working the machine is to mount it upon a table having below it a treadle-shaft and pulley, such as a sewing-machine table of the lighter kind, and then connecting the two pulleys by a belt, as at $g$, so that the roller A C can be driven by working the treadle, and thus leaving both hands of the workman free to feed the machine. By making these rollers long enough, two or more persons can feed in the pease at the same time, and the capacity of a machine can be greatly increased.

In the operation of shelling, the end of the pod, with the joint or line of separation between the halves held uppermost, is inserted between the rollers at one of the spirals, so that it shall be caught between its edge and the face of the plain roller, and by the rotation of these two surfaces the pod is carried through and discharged at the opposite side. The spiral roller, in rotating, spreads out the pod, and by moving the halves longitudinally along the plain roller at the same time, it acts to strip the pease clean of the pod and throw them out in front of the machine. The edge of the spiral thus splits and separates the pods, while the twisted or spiral surface detaches the pease as the pod is carried along and through the two rollers.

Having thus described my invention, what I claim, and desire to secure by Letters Patent, is—

A series of spirally-grooved rollers having the breadth of the grooves graduated in the different rollers of the series mounted in a framing, in conjunction with plain rollers, in combination with said plain rollers and framing, substantially as set forth.

In witness whereof I have hereunto set my hand and seal.

FELICE MOLINI. [L. S.]

Attest:
EDWARD E. OSBORN,
W. F. CLARK.